(12) United States Patent
Wang

(10) Patent No.: US 7,990,692 B2
(45) Date of Patent: Aug. 2, 2011

(54) ELECTRONIC DEVICE WITH HINGED COVER

(75) Inventor: Wei-Jun Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 87 days.

(21) Appl. No.: 12/508,590

(22) Filed: Jul. 24, 2009

(65) Prior Publication Data

US 2010/0165558 A1    Jul. 1, 2010

(30) Foreign Application Priority Data

Dec. 27, 2008   (CN) .......................... 2008 1 0306584

(51) Int. Cl.
*H05K 7/12* (2006.01)

(52) U.S. Cl. ...................... 361/679.02; 361/724; 16/326
(58) Field of Classification Search ............. 361/679.01, 361/724, 679.02, 679.26, 679.09, 679.21; 16/326, 327, 335, 342, 228; 248/917–924
See application file for complete search history.

(56) References Cited

U.S. PATENT DOCUMENTS 5,469,327 A * 11/1995 Cheng ...................... 361/679.55
6,053,589 A *  4/2000 Lin .............................. 312/271

* cited by examiner

*Primary Examiner* — Jayprakash N Gandhi
*Assistant Examiner* — Ingrid Wright
(74) *Attorney, Agent, or Firm* — Zhigang Ma

(57) ABSTRACT

An electronic device includes a main body, a cover, and two supports. The main body defines two receiving slots. The cover is hinged on the main body. The supports are slidably connected to the main body, capable of being entirely received in the receiving slots or protruding out of the main body, in response to positions of the cover.

14 Claims, 6 Drawing Sheets

ELECTRONIC DEVICE WITH HINGED COVER

BACKGROUND

1. Technical Field

The present disclosure generally relates to electronic devices and, particularly, to an electronic device with a main body and a hinged cover.

2. Description of Related Art

Notebook computers have become popular alternatives to desktop computers because of their portability. A typical notebook computer includes a display body and a main body with a keyboard. The display body is hinged on the main body so that the display body can be opened and closed relative to the main body. In most circumstances, a typical notebook computer is operated on a table or desktop. However, the keyboard on the main body is usually parallel to the tabletop making it uncomfortable to operate. In addition, a bottom face of the main body of the notebook computer is substantially entirely in contact with the tabletop. Heat produced by internal electronic components cannot be dispersed efficiently from the main body of the notebook, even though the notebook has a fan for heat dissipation. As a result, the internal electronic components may be damaged from overheating. Accordingly, a notebook computer which can solve the described limitations is needed.

One such notebook computer has a keyboard that pops up away from a main body of the notebook computer and angles relative to the main body to increase comfort for the user and create a gap for dissipating heat is formed between the keyboard and the main body.

However, dust and other contaminants may easily enter the main body through the gap and deposit on the internal electronic components. This may cause short circuits and hamper dispersion of heat produced by the internal electronic components.

Therefore, an electronic device which overcomes the described limitations is desirable.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTIONS

Figure 1:
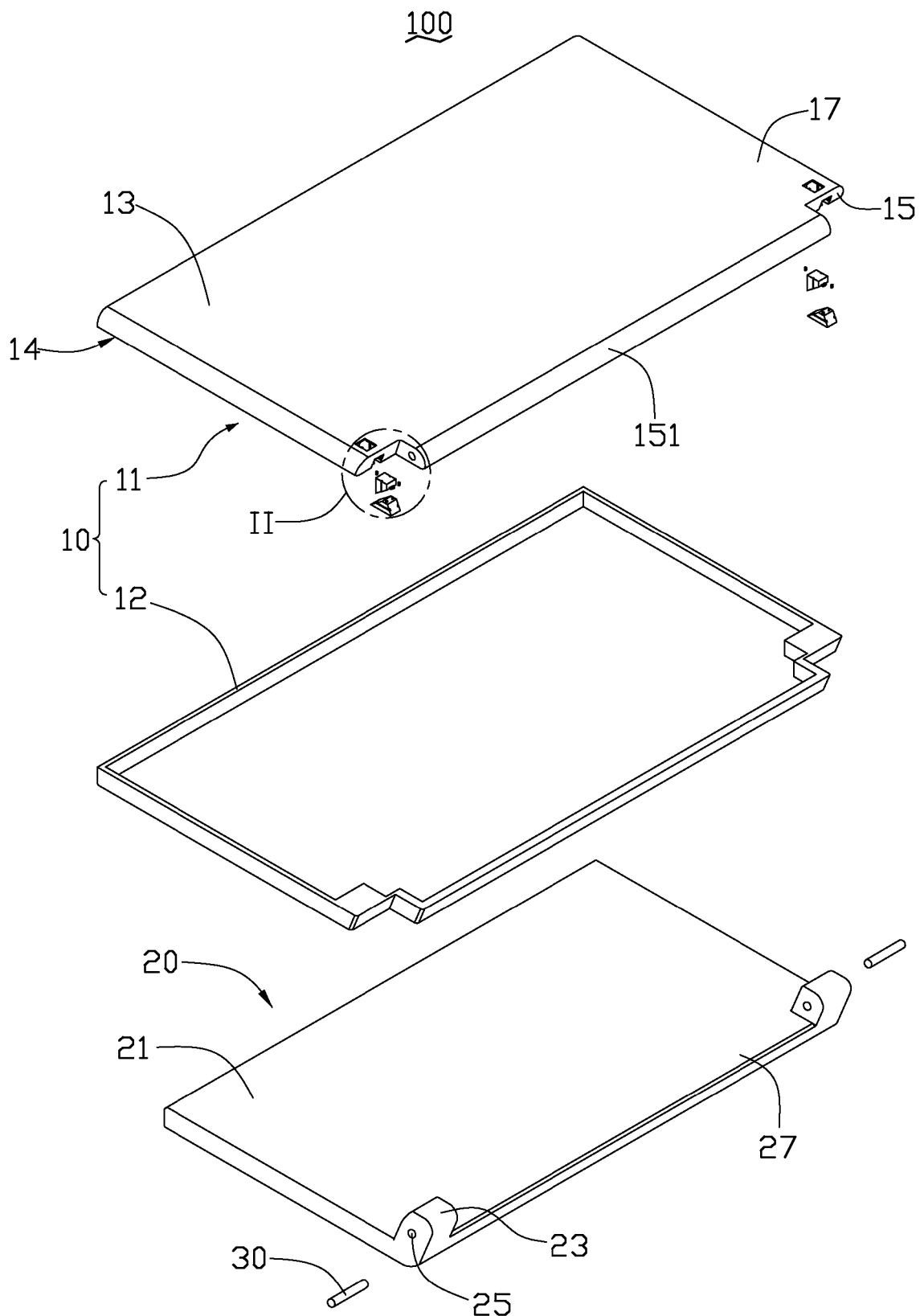
FIG. 1 is an exploded, isometric view of a first embodiment of an electronic device.
Figure 2:
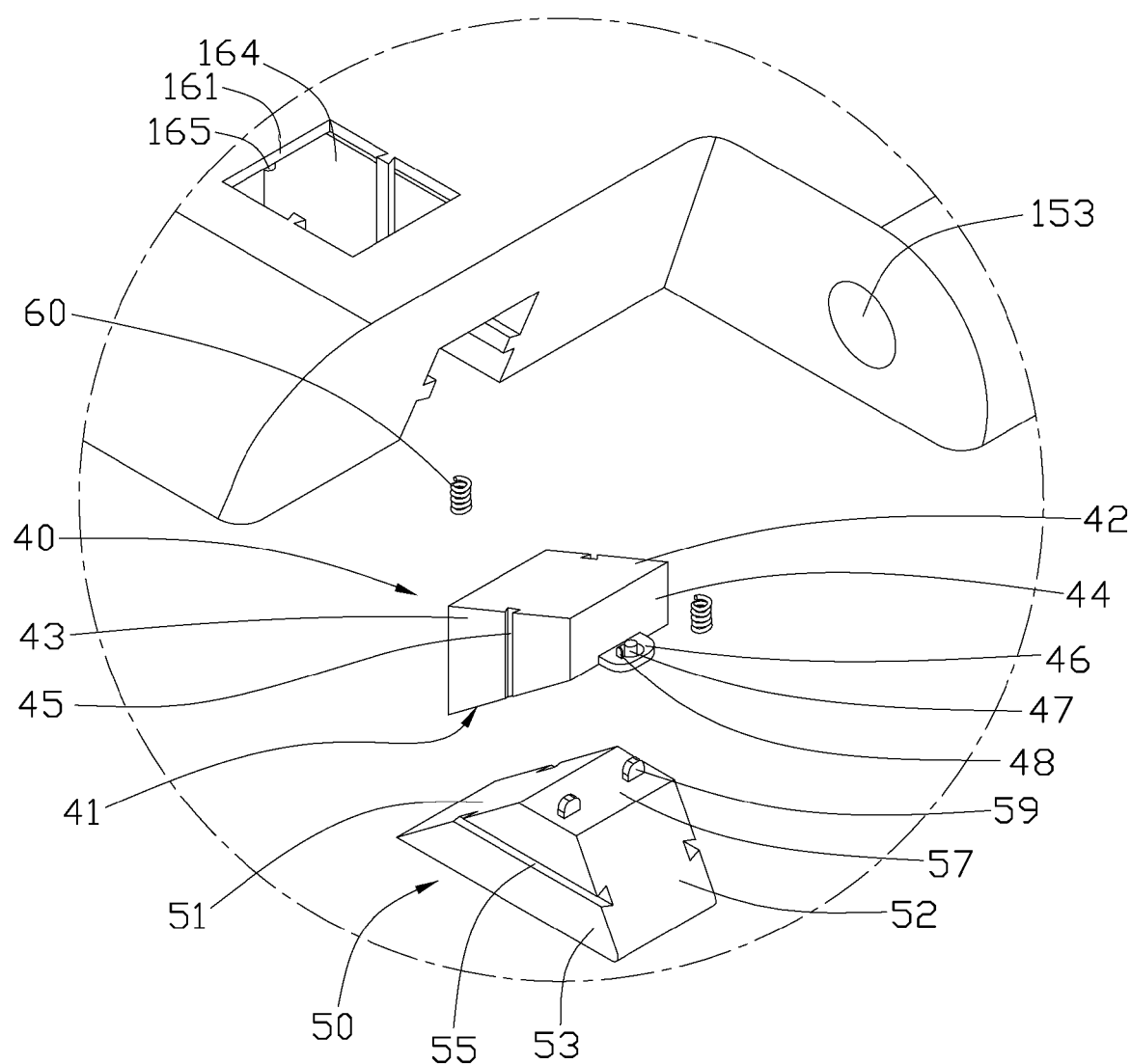
FIG. 2 is a an enlarged view of the region II of the electronic device of FIG. 1.
Figure 3:
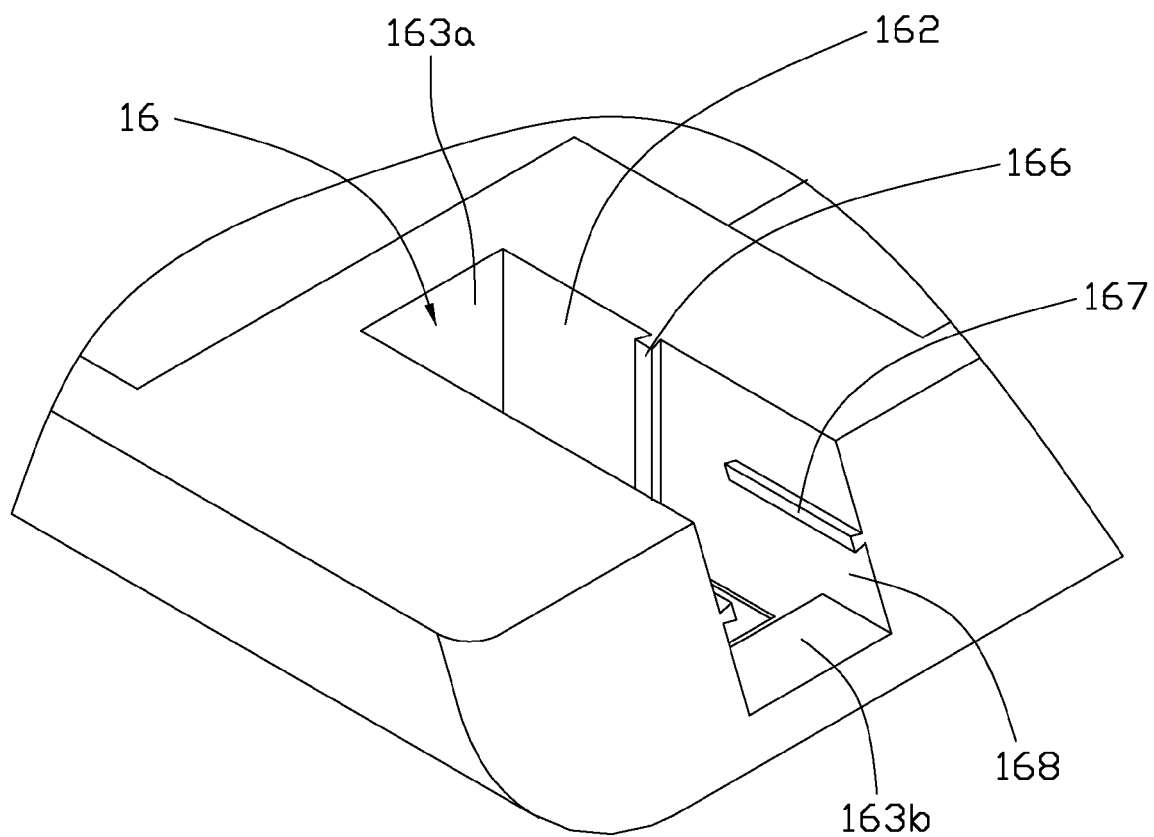
FIG. 3 is an enlarged view of part of the electronic device of FIG. 1.

Referring to FIGS. 1 through 3, a first embodiment of an electronic device 100 includes a main body 10, a cover 20, two pivot shafts 30, two supports 40, two driving members 50, and a plurality of elastic members 60. The cover 20 is hinged on the main body 10 via the pivot shafts 30. The supports 40 and the driving members 50 are received in the main body 10.

In the illustrated embodiment, the electronic device 100 is a notebook computer. The electronic device 100 may include one or more pivot shafts 30, one or more supports 40, and one or more driving members 50.

The main body 10 includes a base 11 and a housing 12 coupled to the base 11. The base 11 includes a bottom surface 13, a top surface 14 opposite to the bottom surface 13, and a side surface 15 connecting the bottom surface 13 with the top surface 14. The main body 10 forms a connecting portion 151 protruding from the side surface 15. The connecting portion 151 defines two shaft holes 153 at two ends, respectively, to receive the pivot shafts 30. The main body 10 defines two receiving slots 16 adjacent to two ends of the connecting portion 151 correspondingly. The receiving slots 16 extend from the top surface 14 towards the bottom surface 13 and communicate with the side surface 15. A bottom wall 161, two opposite first sidewalls 162, a second sidewall 163a connecting the first sidewalls 162, and a connecting beam 163b opposite to the second sidewall 163a cooperatively defines the receiving slot 16. The bottom wall 161 defines an opening 164, and forms two poles 165 at opposite sides of the opening 164 correspondingly. Each of the first sidewalls 162 forms a first guide rail 166 substantially perpendicular to the bottom surface 13 and a second guide rail 167 extending substantially perpendicular to the first guide rail 166. The main body 10 defines a cutout 168 in the side surface 15. The connecting beam 163b defines a step 169 (see FIG. 5) facing the opening 164.

The cover 20 includes a bottom surface 21 and forms two opposite resisting portions 23 on the bottom surface 21. Each resisting portion 23 defines a pivot hole 25 to receive a corresponding pivot shaft 30, and a mounting space 27 is defined between the resisting portions 23. In the illustrated embodiment, the cover 20 is substantially rectangular.

Each support 40 is substantially wedge-shaped including an inclined surface 41, a supporting surface 42 opposite to the inclined surface 41, two opposite side surfaces 43, and two opposite end surfaces 44. Each of the side surfaces 43 defines a first sliding groove 45 to engage one of the first guide rails 166. One of the end surfaces 44 is larger than the other. Each of the end surfaces 44 forms a contact protrusion 46 including a positioning post 47 and a receiving portion 48 configured to fix the elastic member 60. In the illustrated embodiment, the receiving portion 48 is an elastic piece.

Each driving member 50 is substantially a prism having a trapezoidal cross-section. The driving member 50 includes an inclined surface 51, a resisting surface 52 opposite to the inclined surface 51, two opposite side surfaces 53, and two opposite end surfaces 57. Each of the side surfaces 53 defines a second sliding groove 55 to engage one of the second guide rails 167. One of the end surfaces 57 forms at least one ear 59. In the illustrated embodiments, there are two ears 59 and the ears 59 are elastic.

Referring to FIGS. 1 through 4, during assembly of the electronic device 100, the elastic members 60 are sleeved on the positioning posts 47 of one of the supports 40, and the receiving portions 48 are deformed to position the elastic members 60 on the support 40. The support 40 is received in one of the receiving slots 16 of the main body 10 from the top surface 14 and the first sliding grooves 45 are slidably engaged in the first guide rails 166 correspondingly. The elastic members 60 are also sleeved on the poles 165 of the main body 10. One of the driving members 50 is received in the corresponding receiving slot 16 running through the cutout 168, and the second sliding grooves 55 are slidably engaged in the second guide rails 167. Upon insertion of the driving member 50 into the receiving slot 16, the ears 59 deform. Once the ears 59 pass the connecting beam 163b, the ears 59 return to the original state and resist the step 169, preventing the driving member 50 from dislodging from the main body 10. The inclined surface 51 of the driving member 50 engages the inclined surface 41 of the support 40. The other support 40 and the other driving member 50 are assembled in the other receiving slot 16 of the base 11 of the main body 10 as described. Each of the pivot shafts 30 passes through the pivot hole 25 of one of the resisting portions 23 of the cover 20 and engages one of the shaft holes 153 of the base 11 to rotatably connect the cover 20 to the base 11 of the main body 10. The housing 12 is coupled to the base 11. As such, the electronic device 100 is assembled.

Figure 4:
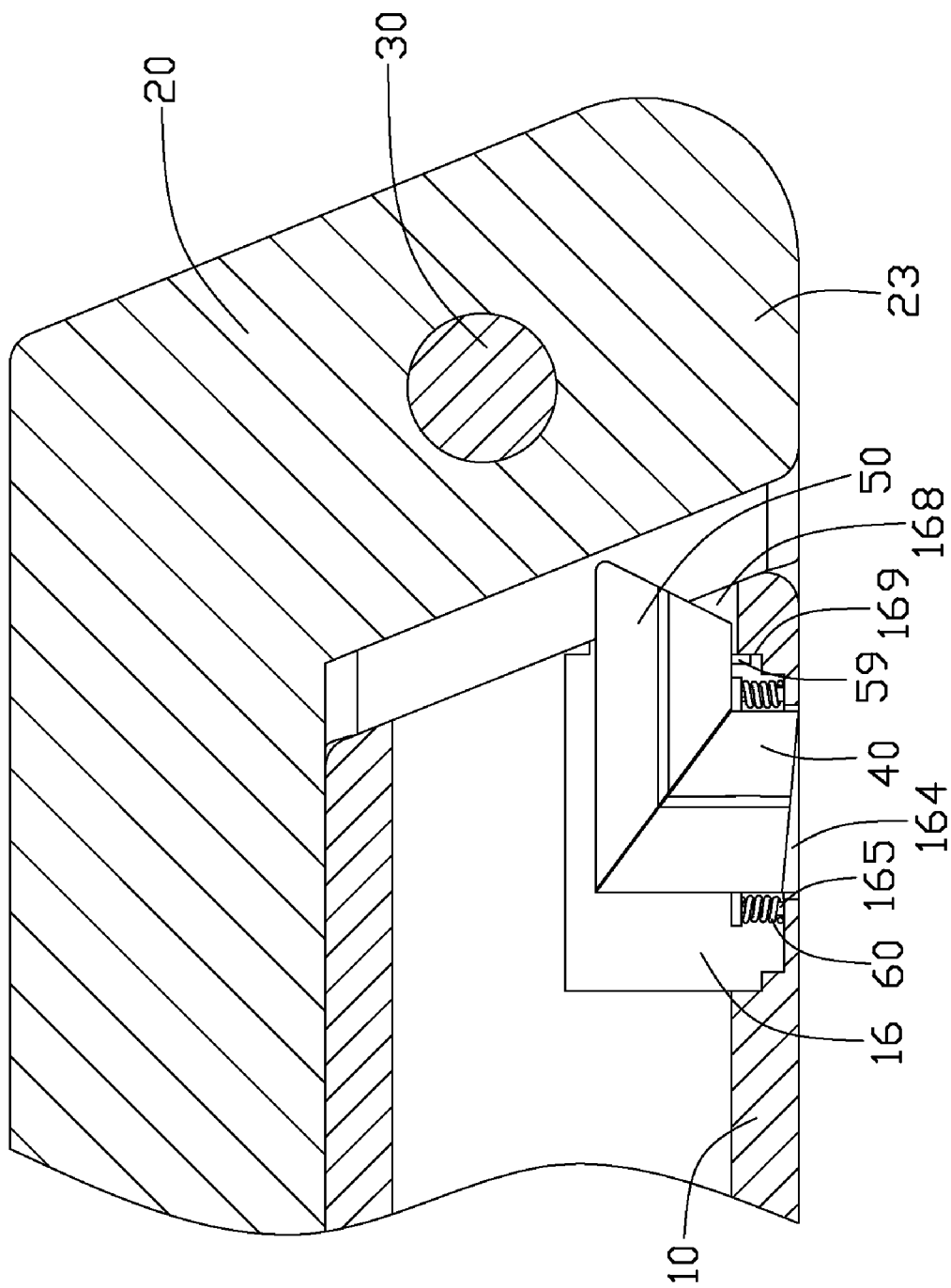
FIG. 4 is a partial, cross-sectional view of the electronic device of FIG. 1, shown in a first state.
Figure 5:
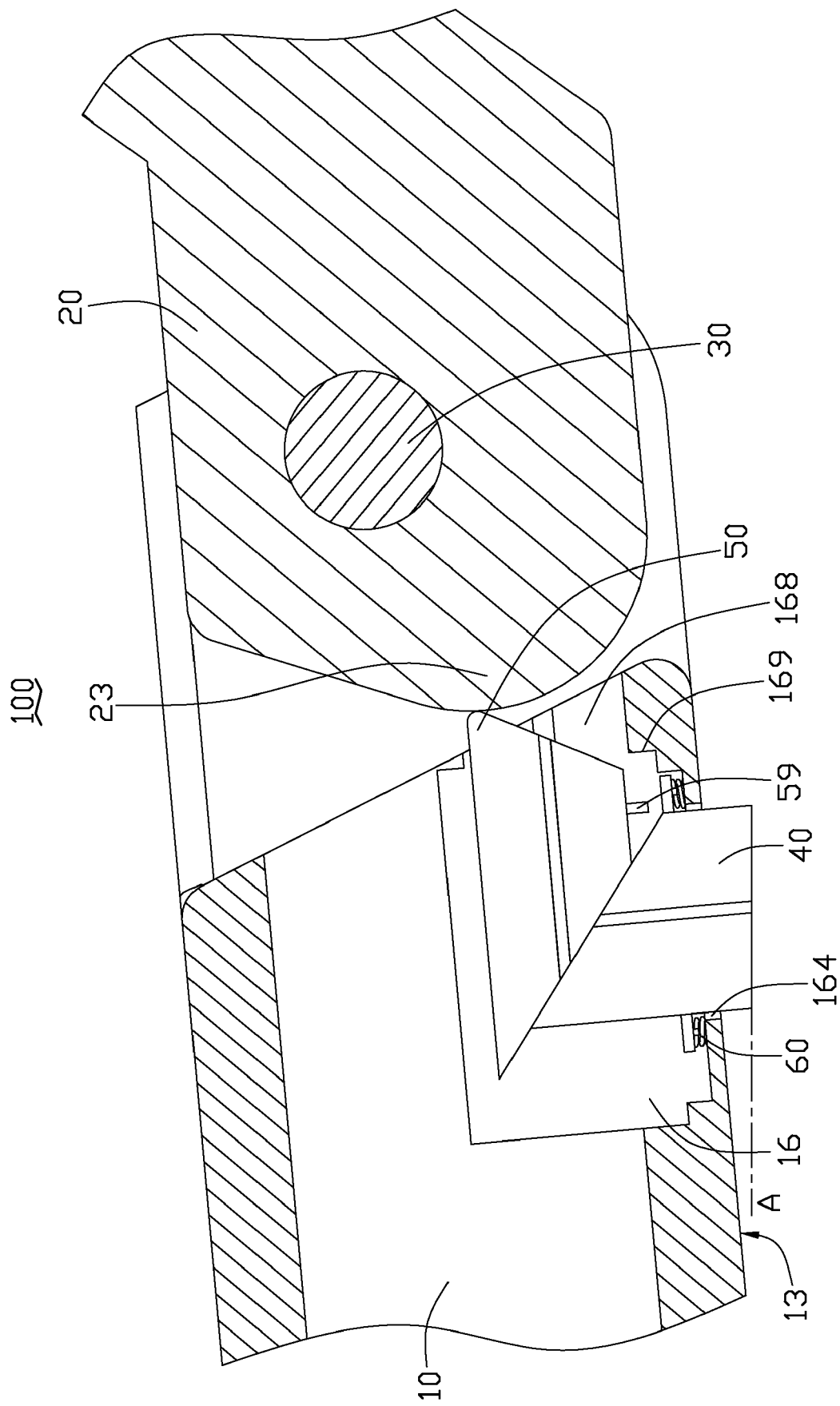
FIG. 5 is similar to FIG. 4, but shows a second state.

Referring to FIGS. 4 and 5, when the electronic device 100 is in a first state, the supports 40 are entirely received in the receiving slots 16 and the electronic device 100 is not supported by the supports 40. When the electronic device 100 is in a second state, the supports 40 protrude out of the receiving slots 16 from the bottom surface 13. To switch the electronic device 100 between the first and the second state, the cover 20 is rotated, and resisting portions 23 of the cover 20 resist and slide the resisting surfaces 52 of the driving members 50 along the second guide rails 167 of the main body 10, and the supports 40 slide along the first guide rails 166, being pushed by the inclined surface 51 upon the inclined surface 41. At least part of the supports 40 slide out of the receiving slots 16 via the openings 164. As such, the supports 40 contact a surface such as a table and support the electronic device 100. The main body 10 of the electronic device 100 is thus lifted and supported at an inclined angle by the supports 40, creating a spacious gap therebetween. To return the electronic device 100 to the first state, the cover 20 is rotated to release resistance to the driving members 50, and elastic members 60 slide the supports 40 along the first guide rails 166, until fully received in the receiving slots 16 of the main body 10.

In the second state, since the supports 40 protrude out of the bottom surface 13 of the main body 10 by opening the cover 20, the electronic device 100 is inclined at an angle such that the lifted side of the electronic device 100 is above a surface such as a tabletop. Therefore, operating a keyboard of the electronic device 100 is more comfortable, and heat is quickly dispersed from the bottom surface 13 through the spacious gap defined between the main body 100 and the supporting area.

It may be appreciated that the electronic device 100 may include one or more supports 40. If the electronic device 100 includes a single support 40, the support 40 may be preferably positioned on a middle portion of the main body 10 along a hinged side.

Figure 6:
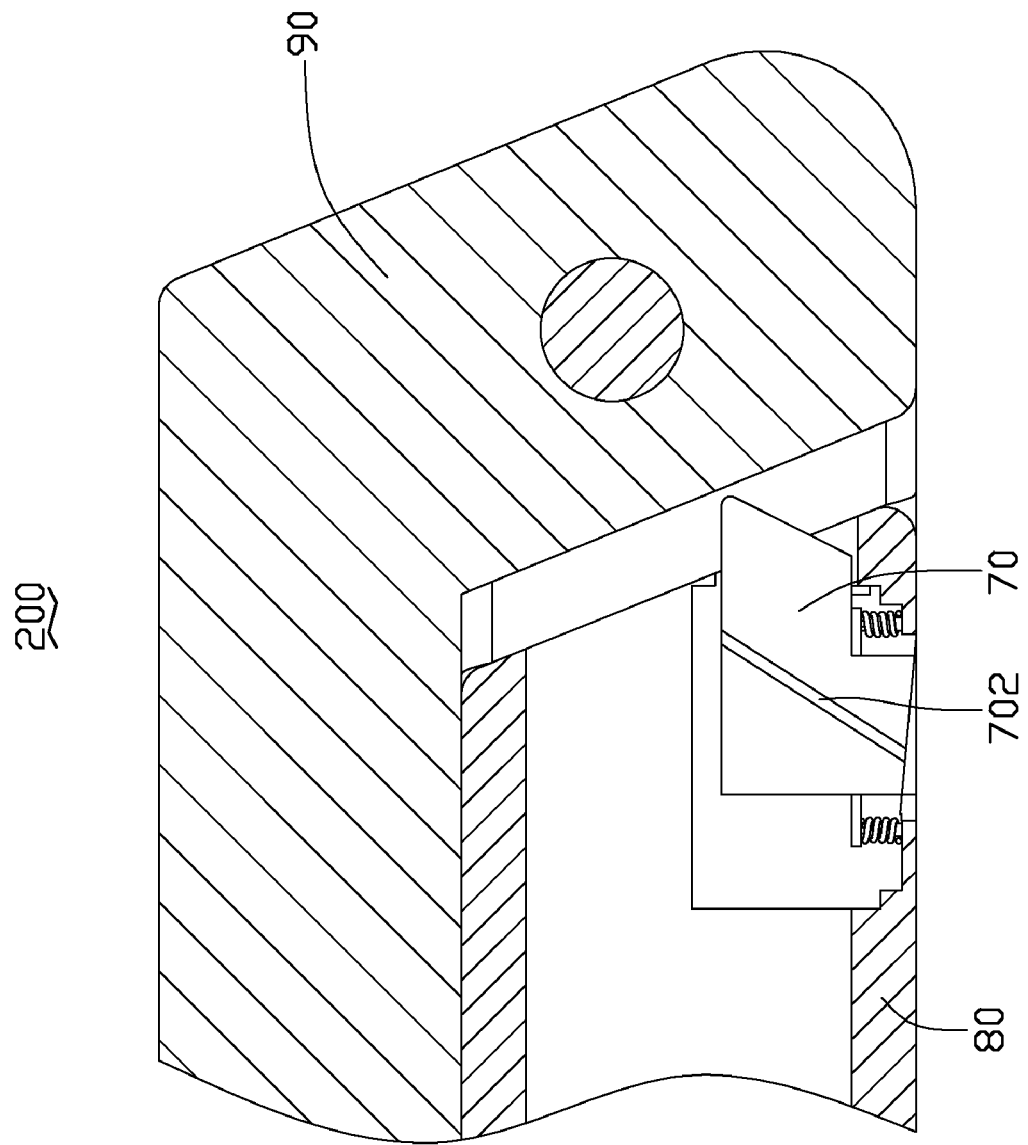
FIG. 6 a partial, cross-sectional view of a second embodiment of an electronic device.

FIG. 6 shows a second embodiment of an electronic device 200, differing from the first embodiment of the electronic device 100 only in that the supports 40 and the driving members 50 are replaced by supports 70, which define one or more inclined sliding grooves 702 to slidably engage one or more inclined guide rails formed on a sidewall of a main body 80. A cover 90 is hinged on the main body 80 and configured to resist the supports 70.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An electronic device, comprising:
   a main body defining at least one receiving slot;
   a cover hinged on the main body;
   at least one driving member; and
   at least one support slidably connected to the main body, each configured for being entirely received in one of the at least one receiving slot or protruding out of the main body, in response to positions of the cover, wherein the main body comprises a bottom surface to contact a supporting member on which the electronic device rests, the at least one support protruding out of the bottom surface of the main body, the cover comprises at least one resisting portion to drive the at least one support to slide, the at least one driving member is configured for sliding in a first direction driven by the cover, the at least one support is configured for sliding in a second direction substantially perpendicular to the first direction in response to the sliding of the at least one driving member; and the at least one resisting portion prevents the at least one driving member from sliding.

2. The electronic device of claim 1, wherein the main body forms a first guide rail substantially perpendicular to the bottom surface and a second guide rail extending substantially perpendicular to the first guide rail in each of the at least one receiving slot; the each of the at least one driving member defines a second sliding groove to engage the second guide rail, and the at least one support defines a first sliding groove to engage the first guide rail; wherein the support and the at least one driving member comprises inclined surfaces with which to engage each other.

3. The electronic device of claim 2, wherein the main body comprises a bottom wall, two opposite first sidewalls, a second sidewall connecting the first sidewalls, and a connecting beam opposite to the second sidewall cooperatively defining the receiving slot, wherein the first guide rail and the second guide rail are formed on at least one of the first sidewalls; each of the at least one support further comprises a supporting surface opposite to the inclined surface, two opposite side surfaces, and two opposite end surfaces; each of the at least one driving member further comprises a resisting surface opposite to the inclined surface, two opposite side surfaces, and two opposite end surfaces, wherein the first sliding groove is defined in at least one of the side surfaces of the support, and the second sliding groove is defined in at least of one of the side surfaces of the driving member.

4. The electronic device of claim 3, wherein the bottom wall of the main body defines an opening out of which each of the at least one support can protrude out of the receiving slot.

5. The electronic device of claim 4, wherein the at least one receiving slot comprises two receiving slots defined on opposite ends of a side of the main body, respectively; wherein the number of the at least one support is two.

6. The electronic device of claim 1, wherein the at least one resisting portion of the cover prevents the at least one support from sliding on an incline relative to the bottom surface.

7. The electronic device of claim 1, further comprising at least one elastic member disposed between each of the at least one support and the main body to force the at least one support to return to the corresponding receiving slot.

8. The electronic device of claim 7, wherein at least one of the end surfaces of each of the at least one support forms a contact protrusion including a positioning post and a receiving portion to position and resist the at least one elastic member.

9. The electronic device of claim 1, further comprising at least one pivot shaft to hinge the cover on the main body.

10. The electronic device of claim 1, wherein the main body comprises a base and housing coupled to the base, the at least one receiving slot is defined in the base.

11. An electronic device, comprising:
a main body defining at least one receiving slot;
a cover hinged on the main body and comprising at least one resisting portion;
at least one driving member; and
at least one support slidably connected to the main body, wherein when the cover is rotated relative to the main body, the at least one resisting portion causes the at least one support to slide, so that the main body is supported by the at least one support, the main body comprises a bottom surface to contact a supporting member on which the electronic device is held, the at least one support protrudes out of the bottom surface of the main body, the at least one resisting portion is configured to prevent the at least one support from sliding, the at least one driving member is capable of sliding in a first direction, the at least one support is capable of sliding along a second direction substantially perpendicular to the first direction driven by the at least one driving member; and the at least one resisting portion prevents the at least one driving member from sliding.

12. The electronic device of claim 11, wherein the at least one resisting portion of the cover prevents each of the at least one support from sliding on an inclined surface relative to the bottom surface.

13. The electronic device of claim 11, further comprising at least one elastic member disposed between each of the at least one support and the main body to return the at least one support to the at least one receiving slot.

14. The electronic device of claim 11, wherein the electronic device is a notebook computer.

* * * * *